(12) United States Patent
Wong et al.

(10) Patent No.: US 11,688,156 B2
(45) Date of Patent: Jun. 27, 2023

(54) SCENE RECOGNITION BASED ON LABELED FEATURE VECTORS OF AN IMAGE

(71) Applicant: Black Sesame International Holding Limited, San Jose, CA (US)

(72) Inventors: Zi Sian Wong, Singapore (SG); Fangwen Tu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/355,979

(22) Filed: Jun. 23, 2021

(65) Prior Publication Data

US 2022/0414395 A1 Dec. 29, 2022

(51) Int. Cl.
| | | |
|---|---|---|
| *G06V 10/46* | (2022.01) | |
| *G06T 7/194* | (2017.01) | |
| *G06T 3/40* | (2006.01) | |
| *G06V 20/00* | (2022.01) | |
| *G06F 18/214* | (2023.01) | |
| *G06F 18/25* | (2023.01) | |
| *G06F 18/2415* | (2023.01) | |
| *G06V 10/764* | (2022.01) | |
| *G06V 10/82* | (2022.01) | |

(52) U.S. Cl.
CPC .......... *G06V 10/462* (2022.01); *G06F 18/214* (2023.01); *G06F 18/2415* (2023.01); *G06F 18/251* (2023.01); *G06T 3/4046* (2013.01);

*G06T 7/194* (2017.01); *G06V 10/764* (2022.01); *G06V 10/82* (2022.01); *G06V 20/35* (2022.01)

(58) Field of Classification Search
CPC ........ G06V 20/35; G06V 10/20; G06V 10/62; G06V 10/462; G06V 10/764; G06V 10/82; G06K 9/6256; G06K 9/6277; G06K 9/6289; G06T 3/4046; G06T 7/194; G06F 18/214; G06F 18/2415; G06F 18/251
See application file for complete search history.

(56) References Cited

U.S. PATENT DOCUMENTS

| | | | |
|---|---|---|---|
| 9,129,161 B2 | 9/2015 | Agosta et al. | |
| 2019/0156122 A1* | 5/2019 | Lu | .......... G06V 10/764 |
| 2021/0271847 A1* | 9/2021 | Courtiol | .................... G06T 7/11 |
| 2021/0366127 A1* | 11/2021 | Gu | .......................... G06V 40/10 |

\* cited by examiner

*Primary Examiner* — Casey L Kretzer
(74) *Attorney, Agent, or Firm* — Timothy T. Wang; Ni, Wang & Massand, PLLC (57) ABSTRACT

The present invention discloses a system and method for image processing and recognizing a scene of an image. The system utilizes a Multi-mode scalable network system and regrouping pipeline. The system is AI based system which uses neuro network. The system includes a pre-processing, processing and a post-processing unit. The system uses optical information recorded from the camera of a mobile device to extract and analyze the content in an image such as a photo or video clip. Based on the retrieved information, a label is given to best describe the scene of the image.

13 Claims, 8 Drawing Sheets

SCENE RECOGNITION BASED ON LABELED FEATURE VECTORS OF AN IMAGE

FIELD OF INVENTION

The present invention relates generally to a system and method for image processing and recognizing a scene of an image. More specifically, the present invention is directed to an AI-based multi-media processing system for recognizing a scene of an image.

BACKGROUND OF THE INVENTION

Existing solutions for image recognition and analysis often rely on computationally expensive methods such as object recognition methods, pixel-level segmentation, or scanning a detection window over an image, etc. During any object recognition, these existing approaches analyze the pixel data in the image to determine how the image should be segmented. The analysis requires significant processing time and can thus introduce latency or a time lag that can annoy users. As a result, it is generally impractical to use these solutions on mobile computing devices to analyze video streams being captured by those devices in real-time or images captured in the mobile computing devices.

Many existing vehicular video systems provide a little or no interpretation or analysis or recognition of images captured by them, such as images captured by current rear-view cameras. The systems may overlay the road geometry with images to highlight various aspects (e.g., a footprint of a vehicle when parking), but do so without interpreting the scene depicted by the images. Also, some systems may store or share images with other vehicles in compressed or reduced form, but they generally do not provide analysis or interpretation for the images. Other specialized vehicular video systems may identify specific driving-relevant features in the image, such as lane boundaries or crosswalks; they generally do not provide a holistic scene-level analysis to characterize the image.

A U.S. Pat. No. 9,129,161 assigned to Toyota Motor Corp. discloses a technology for inferring scenes from images. The invention further discloses a system for inferring scenes from images including a processor and memory storing instructions that, when executed, cause the system to determine partition regions for an image depicting a scene. The system receives image data including pixels forming the image and classifying pixels of the image into one or more pixel types based on one or more pixel-level features. The system basically determines each partition region and classifies a scene of the image based on the set of pixel characteristic data of each of the partition regions. Though the system classifies scenes in the image through pixels, however, the lack of re-stamping and deep learning makes the system a bit time lagging and less relevant.

A research paper "Object recognition from local scale-invariant features" assigned to D. G. Lowe discloses an object recognition system which is developed using a new class of local image features. The features share similar properties with neurons in the inferior temporal cortex that are used for object recognition in primate vision. Features are efficiently detected through a staged filtering approach that identifies stable points in scale space. The system uses advanced recognition techniques but lacks advanced re-stamping which leads to a little less distinctive or less processed image.

Another research paper "Face Description with Local Binary Patterns" assigned to T. Ahonen discloses an efficient facial image representation based on local binary pattern (LBP) texture features. The face image is divided into several regions from which the LBP feature distributions are extracted and concatenated into an enhanced feature vector to be used as a face descriptor. Though the system is improved on few aspects than the former one, however, the lack of a re-grouper for further classifying the descriptor by various labels leads to a bit unreliable system in terms of scene recognition and time constraint.

The present invention seeks to provide an improvement in the field of recognizing an image, more specifically, but not exclusively, in the field of deep neural learning image recognition. It is also desirable to keep the cost of the packaging as low as possible while maintaining its durability. The invention is more advanced and precise image processing system with less time lagging feature.

Therefore to overcome the shortcomings of the prior-arts, there is a need to provide an AI-based image processing system. The system utilizes a deep neural network with probability gating for precise categorization and highlighting the attention region and a background region separately. In view of the foregoing inventions, there is a need in the an for an advanced image processing system to overcome or alleviate the before mentioned shortcomings of the prior arts.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced image processing system that recognizes images or multimedia in real-time without lagging using a deep neural network for labelling.

SUMMARY OF THE INVENTION

An image processing system for recognizing a scene of an image, the image processing system includes a pre-processing unit, a processing unit, and a post-processing unit. The pre-processing unit processes the image. The processing includes resizing the image and generating an attention region and a background region of the image. The pre-processing includes re-stamping the attention region on the background region to generate a fused image.

A processing unit for processing the fused image, the processing unit includes an encoder, a labeler, a deep neural network, and a class re-grouper. The encoder is for generating a plurality of distinctive feature vectors of the fused image. The fused image with distinctive vectors is fed to a labeler for allocating a label from a bunch of pre-defined labels each of the plurality of distinctive feature vectors. The deep neural network for predicting probability for each of the predefined labels and the class re-grouper for regrouping the pre-defined labels based on probability prediction to generate a plurality of parent labeled vectors.

The system uses feature extraction as a fundamental step to extract useful characteristics from the data, which in image processing is used to derive meaningful values from input images. The input images are marked with distinctive descriptors by an encoder. The descriptor could be a mixture of pixel properties such as color, texture, or shape of the image.

An encoder is first trained to generate a distinctive feature vector for different scene images. Based on these descriptions, they are classified into one of the pre-defined classes. Finally, a second regrouping network is trained to generate a more granular form of a label.

With smart phones embedding more and more sensors for various applications, the benefits are extended to scene or subject label recognition systems. This is done by combining one or more than one channel of multi-mode information with the original image. The input volume for the neural network includes channels of AF value (auto-focus), EV value (exposure value) and motion value (from gyro or other motion sensors). During training, we introduced a drop-out and noisy scheme which randomly set one or more than one multi-mode channel to null or noisy value. This scheme made our neural network robust to any setup of the multi-mode sensors, including lack of sensors on the devices. Ultimately, the feature vector extracted will take advantage of information beyond the still image and produces an accurate prediction for application.

A post-processing unit for producing scores based on the plurality of parent class outputs, wherein a final label is generated for to recognize the scene of the image based on the scores.

The primary objective of the invention is to provide a deep learning-based feature extraction model. The deep neural network assigns a confidence value to pre-defined labels of the image to predict the probability for a group. Moreover, the deep neural network utilizes the probability gating technique to predict the probability for a group of predefined labels by analyzing illumination, texture, structure, and subjects. Further, the deep neural network is utilized for feature extraction by learning a plurality of descriptors.

The other objective of the invention is to provide a novel pre-processing technique of attention fusion that refocuses the subject from the background.

Another objective of the invention is to provide a scalable network pipeline is designed to further improve the accuracy of scene and subject label prediction that combines multiple mode The yet another objective of the invention is to provide a class regrouping strategy that unites different appearances subjects into parent class label and a post-processing method that utilizes different or conditional thresholds for different classes.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION

The present invention discloses an image processing system. The system classifies captured images into one of the defined scenes or objects. Images depicted as difficult or ambiguous are not labelled from our classification system. Our system introduced 1) a new pre-processing technique to improve subject-centered attention 2) hierarchical grouping system to merge the semantically similar subject of different appearances to a parent class 3) A probability gating technique to utilize interaction between subjects to improve label accuracy and consistency 4) an output confidence thresholding method for different class to generate the final label.

Image recognition is a process that analyzes and understands an image such as a photo or video. Each image includes a large number of pixels with each pixel corresponds to a specific location in the image. They correspond to different light intensity are typically represented in a tuple of three values, forming Red, Green, and Blue (RGB) color space. An image data may include information that describes a scene or object in the image for example a flower or a human. In addition, they could also convey semantic meanings comprehendible by human such as sunset, or snow.

Understanding an image requires disentangling information represented by an image. It has been developed to utilize information such as colors, textures, groups of objects, background scenes within images. A scene is a view of a real-world surrounding that may have no objects, or include multiple objects. As an example, in our application where Sky is a scene label, the image itself may not contain any physical object. A scene image may contain a large number of physical objects of various types such as humans, buildings, or cars. The location, size, and interaction between objects could also convey different semantics depending on the image captured. For a centered and apparent object with minimal background in an image, it is a straightforward process to identify scene labels.

However, an image with no dominant subject may be difficult to be categorized into an object label. As such, it could fall under the more abstract natural scenes, such as sunset, beach, or they could be an un-categorizable image with no distinct label. Scene understanding can be beneficial in various situations such as applying various image enhancement techniques based on the scene, or regrouping photo albums based on tags.

Figure 1:
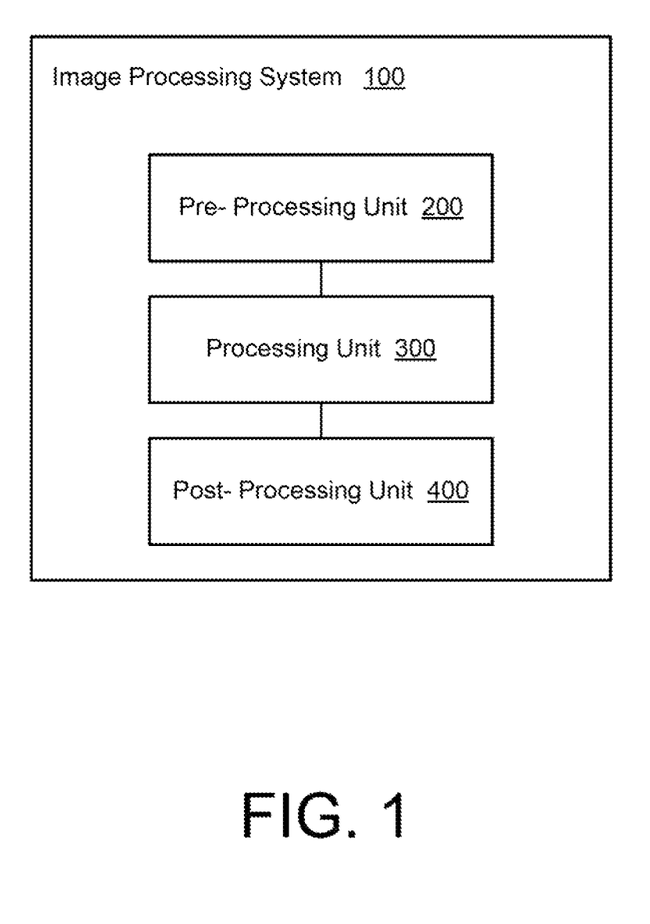
FIG. 1 illustrates an image processing system.

FIG. 1, illustrates an image processing system 100 for recognizing a scene of an image, the image processing system 100 includes a pre-processing unit 200, a processing unit 300, and a post-processing unit 400. The pre-processing unit 200 processes the image. The processing includes resizing the image and generating an attention region and a background region of the image. The pre-processing includes re-stamping the attention region on the background region to generate a fused image.

The proposed method goes through a hard resize technique that directly resizes the image to a square. This is followed by an image restamping strategy that takes the resized image, reduced in resolution, and placed it on top. As such, the overall image is covered with a similar background while the centered unrepeated part is the subject of attention. This image pre-processing method preserves background information and the centered subject is highlighted.

A processing unit 300 for processing the fused image, the processing unit 300 includes an encoder, a labeler, a deep neural network, and a class re-grouper. The encoder is for generating a plurality of distinctive feature vectors of the fused image. The fused image with distinctive vectors is fed to a labeler for allocating pre-defined to labels each of the plurality of distinctive feature vectors. The deep neural network for predicting probability for each of the predefined labels and the class re-grouper for regrouping the pre-defined labels based on probability prediction to generate a plurality of parent class outputs.

The system uses feature extraction as a fundamental step to extract useful characteristics from the data, which in image processing is used to derive meaningful values from input images. The input images are marked with distinctive descriptors by an encoder. The descriptor could be a mixture of pixel properties such as color, texture, or shape of the image.

An encoder is first trained to generate a distinctive feature vector for different scene images. Based on these descriptions, they are classified into one of the pre-defined classes. Finally, a second regrouping network is trained to generate a more granular form of a label.

With a smartphone embedding more and more sensors for various applications, the benefits are extended to scene or subject label recognition system. This is done by combining one or more than one channel of multi-mode information with the original image. The input volume for the neural network includes channels of AF value (auto-focus), EV value (exposure value), and motion value (from gyro or another motion sensor). During training, we introduced a drop-out and noisy scheme which randomly sets one or more than one multi-mode channel to null or noisy value. This scheme made our neural network robust to any setup of the multi-mode sensor, including lack of sensors on the devices. Ultimately, the feature vector extracted will take advantage of information beyond the still image and produces an accurate prediction for application.

A post-processing unit 400 for producing scores based on the plurality of parent class outputs, wherein a final label is generated to recognize the scene of the image based on the scores.

The system produces a score for each class. Based on the scores, the system generates a final label, which can be one of our targeted classes or 'unclassifiable'. To alleviate ambiguous labeling due to multiple subjects and the indistinctive scene in the image, every class may have a different confidence threshold. For closely correlated labels, it is inevitable that there exists a scene with flowers surrounded greenery subjects—leaves, grass, etc. Therefore, the final label may be decided based on more than a single class threshold.

Figure 2A:
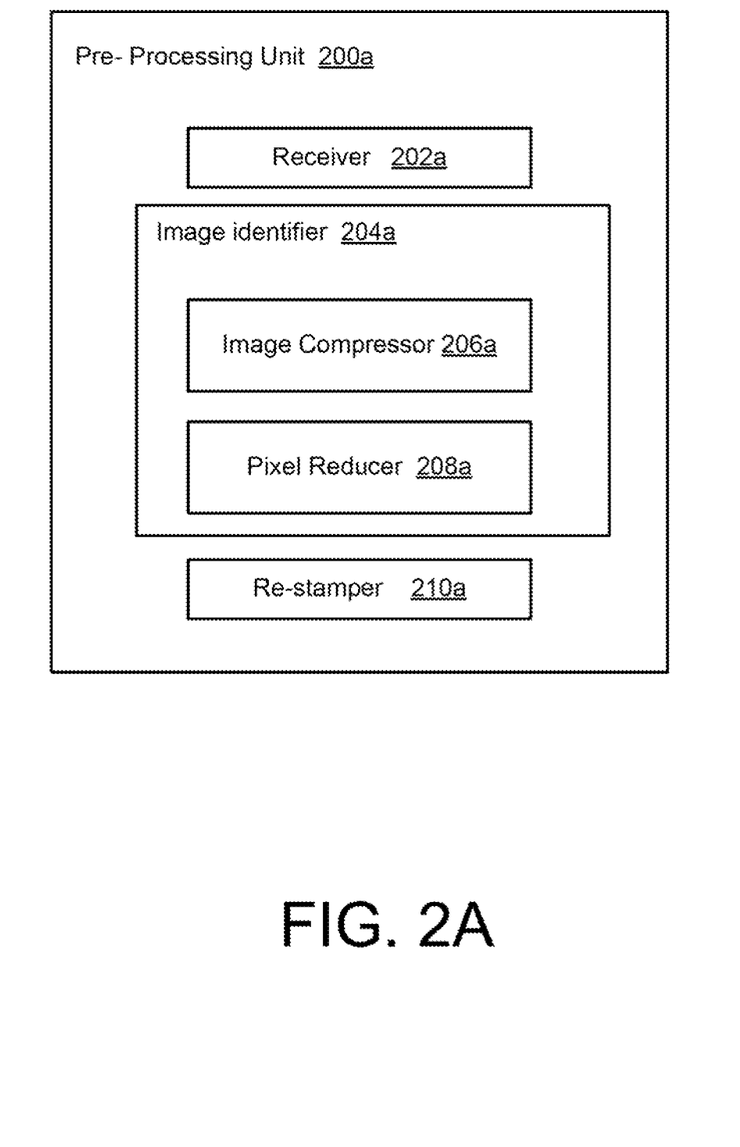
FIG. 2a illustrates a pre-processing unit of the image processing system.

FIG. 2a illustrates a pre-processing unit 200 of the image processing system. The pre-processing unit 200a processes the image on the first level, wherein the pre-processing unit 200a receives the image through receiver 202a and performs resizing and re-stamping of the image. The image is firstly resized with the help of a resize or a compressor.

Primarily, the pre-processor unit includes an image identifier 204a which further includes an image compressor 206a that crop the image in a square shape. Alternatively, the image is compressed into smaller sizes as per the convenience or requirement of the system.

Further attention fusion processing is performed on the cropped image, and the attention region and a background region of the image is identified. A pixel reducer 208a reduces pixels of the attention region. A re-stamper 210 overlays the attention region on the background region and fuses them together to generate a fused image.

Primarily, the system is integrated on a smartphone for processing real-time images or already clicked images stored in the smartphone and recognizing the scenes on those images. Alternatively, the system is integrated into a camera or a tablet for processing the images.

Figure 2B:
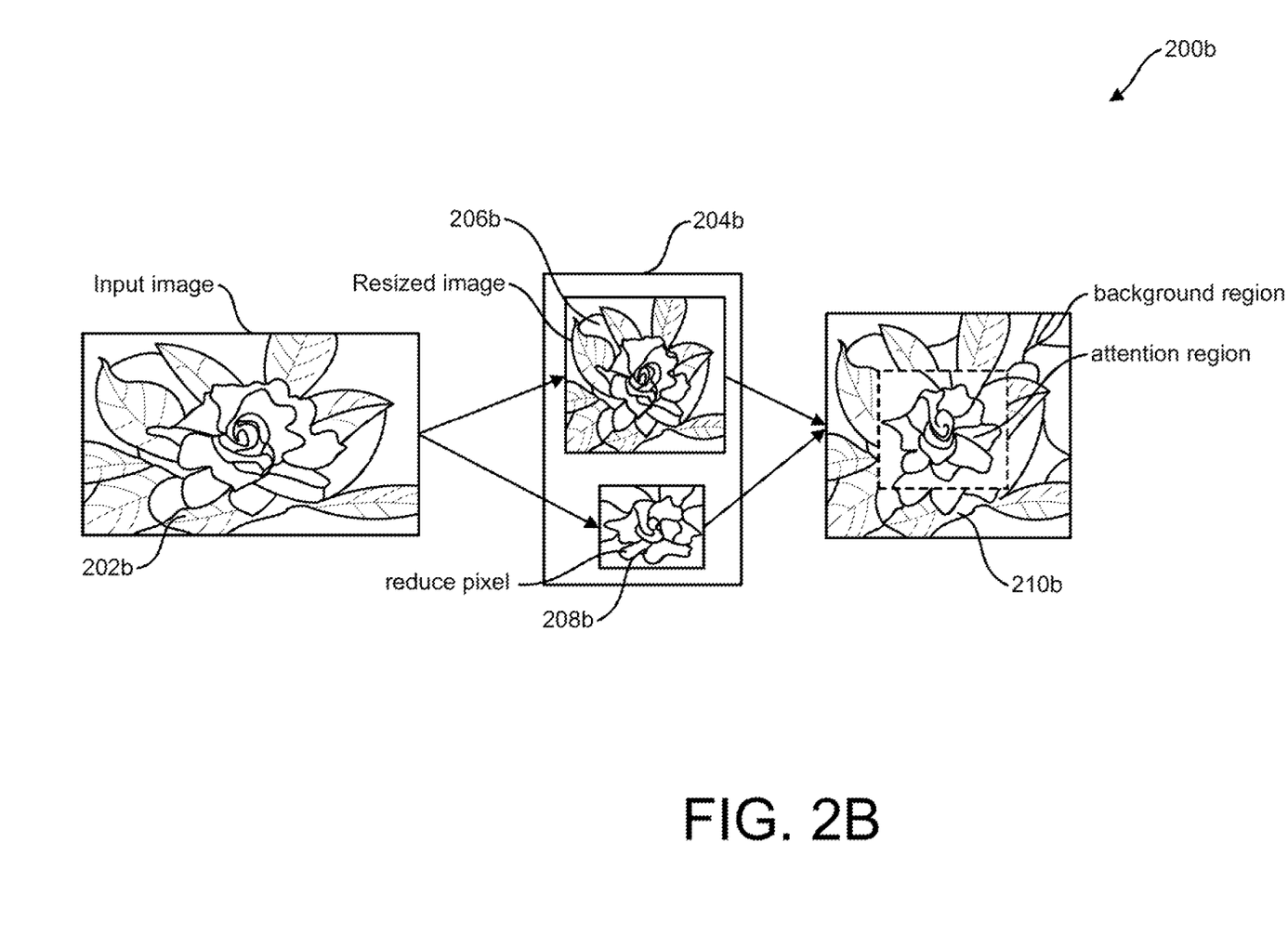
FIG. 2b illustrates architecture of the pre-processing unit.

FIG. 2b illustrates architecture 200b of the pre-processing unit. The Image usually includes the attention region, such as pixel represent subjects, and the background region, such as pixels represent the texture and homogeneity. An attention fusion module 204b is required to fuse the different type of pixel into one image 210 as shown in FIG. 2b.

The method goes through a hard resize technique that directly resizes the input image 202b to square 206b. This is followed by an image restamping strategy that takes the resized image, reduced the resized image in resolution 208b, and placed it on top. As such, the overall image is covered with a similar background while the centered unrepeated part is the subject of attention. This image pre-processing method preserves background information and centered subject is highlighted 210b.

Figure 3A:
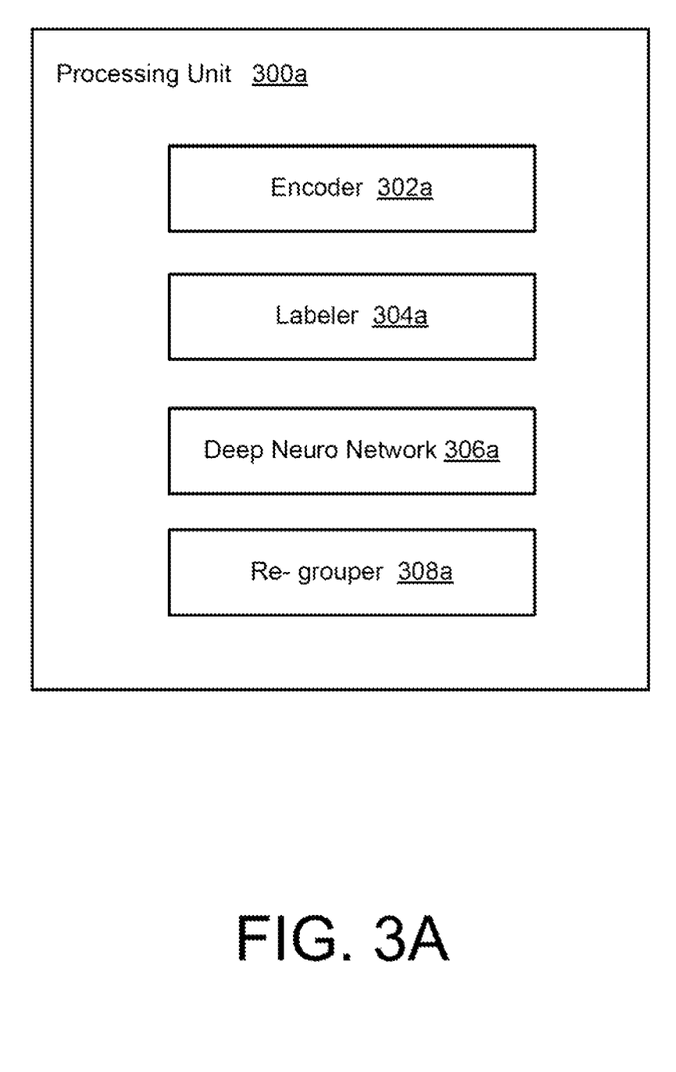
FIG. 3a illustrates a processing unit of the image processing system.

FIG. 3a illustrates a processing unit 300a of the image processing system. The processing unit 300a for processing the fused image, where the processing unit includes an encoder 302a for generating a number of distinctive feature vectors of the fused image. A labeler 304a for assigning a label from a set of pre-defined labels to each of the number of distinctive feature vectors to generate a labeled vector.

A deep neural network 306a uses deep neural learning for predicting probability score for each of the labeled vectors. A class re-grouper 308a for grouping a plurality of labeled vectors based on probability values to generate one or more parent labeled vector.

The processing system processes the fused image and generates the parent labeled vector. The recognized scene is multimedia which either may be an image or a video. The system is an AI-based system that uses neural learning.

Figure 3B:
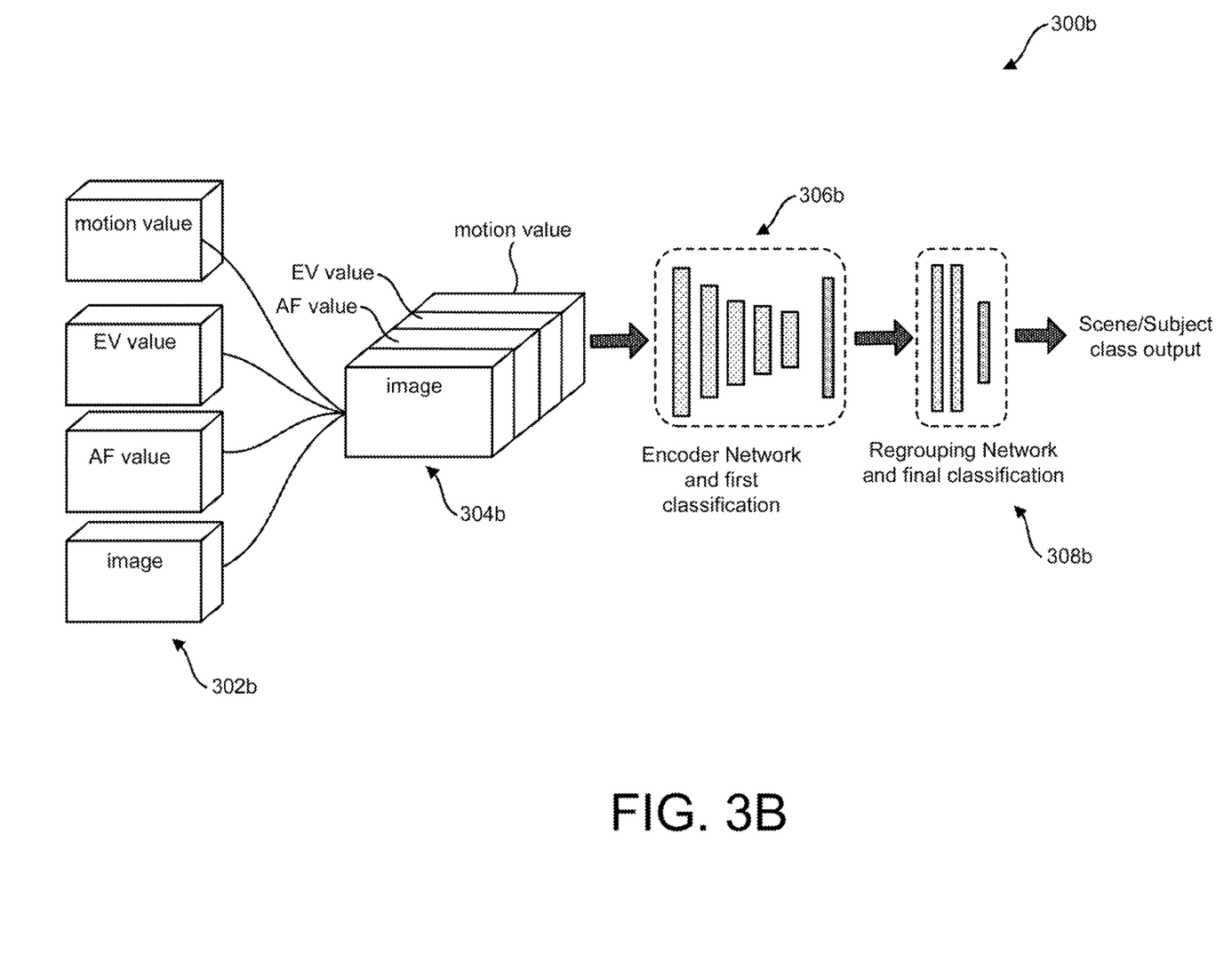
FIG. 3b illustrates architecture of the processing unit.

FIG. 3b illustrates the architecture of the processing unit 300b. The processing unit uses feature extraction as a fundamental step to extract useful characteristics from the data, which in image processing used to derive meaningful values from input images. Commonly, a feature vector is defined as a function of multiple measurements. The descriptor could be a mixture of pixel properties such as color, texture, or shape of the image.

Many different methods have been developed that are based on utilizing the texture information in an image, such as scale-invariant feature transform, a histogram of oriented gradients, local binary patterns (LBPs), and others. In our system, we focus on a deep learning method, that learns descriptors for various targeted classes in a feature extraction model. FIG. 3b depicts our cascaded network pipeline. An encoder is first trained to generate a distinctive feature vector for different scene images. Based on these descriptions, they are classified into one of the pre-defined classes. Finally, a second regrouping network is trained to generate a more granular form of a label.

With the smartphone embedding more and more sensors for various applications, the benefits are extended to scene or subject label recognition system. This is done by combining one or more than one channel of multi-mode information with the original image. The input volume 302b for the neural network includes channels of AF value (autofocus), EV value (exposure value), and motion value (from gyro or another motion sensor). During training, we introduced a drop-out and noisy scheme which randomly sets one or more than one multi-mode channel to null or noisy value. This scheme made our neural network robust to any setup of the multi-mode sensors, including lack of sensors on the devices. Ultimately, the feature vector extracted 304b will take advantage of information beyond the still image and produces an accurate prediction for application.

The scene subject recognition system identifies pre-defined classes 306b, one of which has an unclassifiable label. The labels include scenes such as sunset, greenery scene, nature, or sky, and the subject could be a cat, dog, human, or food. The system regroups 308b subclasses subject which has different appearances to a parent labeled vector as shown in FIG. 3b. Face and human portrait have very different textures since their sizes are different but can be commonly referred to as 'human'.

Figure 4A:
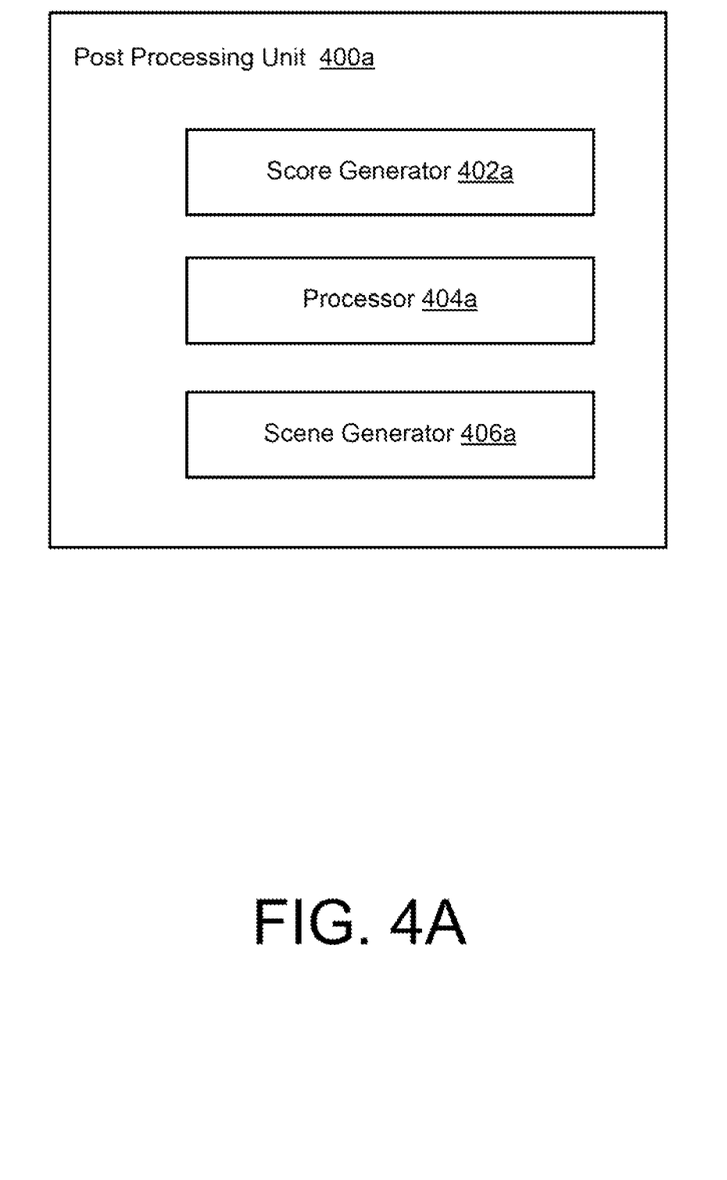
FIG. 4a illustrates a post-processing unit of the image processing system.

FIG. 4a illustrates a post-processing unit 400a of the image processing system. The post-processing unit 400a is for generating scores for the one or more parent labeled vector. The post-processing unit includes a score generator 402a for scores of parent labeled vector. Each of the parent label vectors has a different confidence threshold. A processor 404a processes the parent labeled vector in accordance with the confidence threshold. A scene generator 406a generates a final label through a parent label vector based on the scores retrieved through the confidence threshold in order to recognize the scene of the image.

The post-processing system generates scores through the confidence threshold in order to recognize the scene of multimedia which either may be an image or a video. The system is an AI-based system that uses neural learning.

Figure 4B:
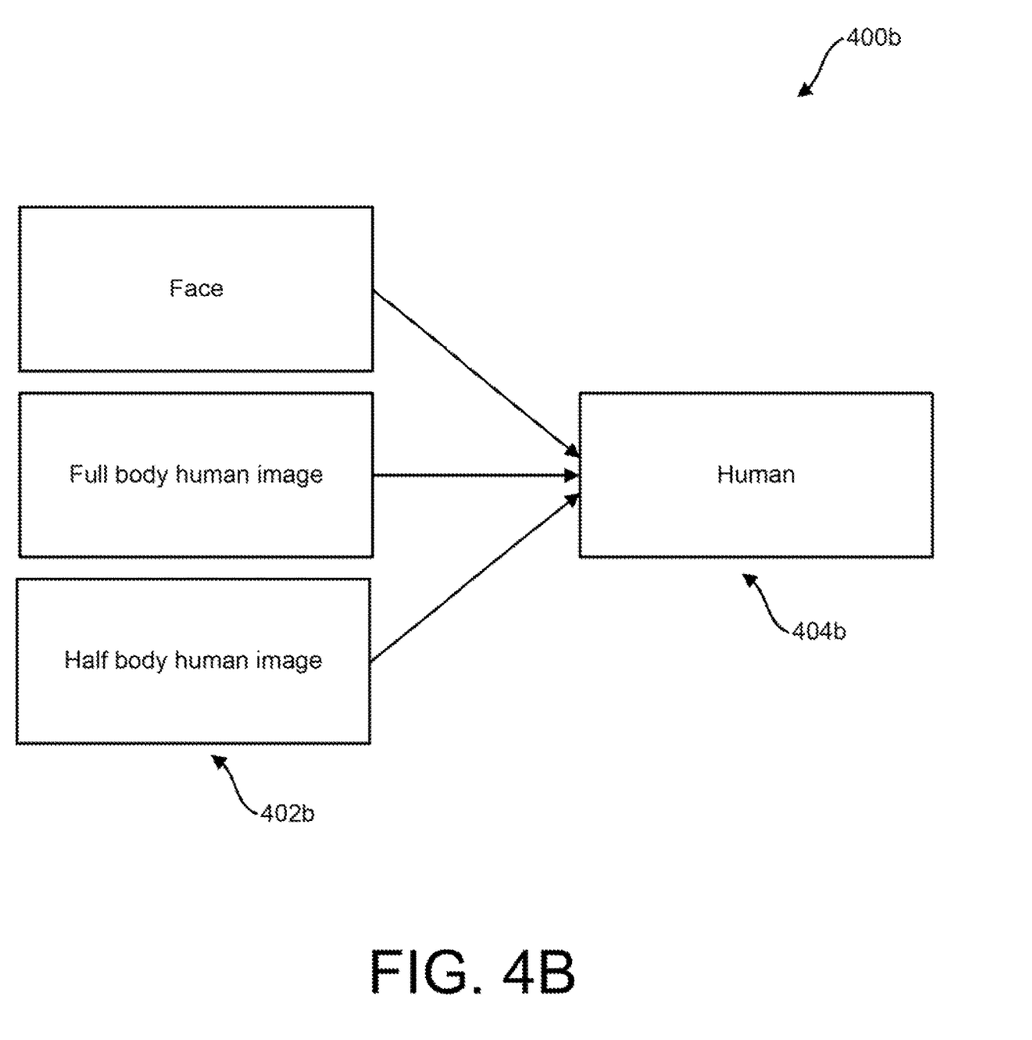
FIG. 4b illustrates architecture of the post-processing unit.

FIG. 4b illustrates the architecture of the post-processing unit. The post-processing system produces a score for each class 402b. Based on the scores, the system generates a final label, which can be one of our targeted classes or 'unclassifiable'.

To alleviate ambiguous labeling due to multiple subjects and indistinctive the scene in the image, every class may have a different confidence threshold. For closely correlated labels, such as 'flower' and 'greenery', it is inevitable that there exists a scene with flowers surrounded greenery subjects—leaves, grass, etc.

Therefore, the final label 404b may be decided based on more than a single class threshold. For example, the system may require 80% confidence to output a 'flower' label when the second-highest label is 'greenery' and may require 90% accuracy otherwise.

Figure 5:
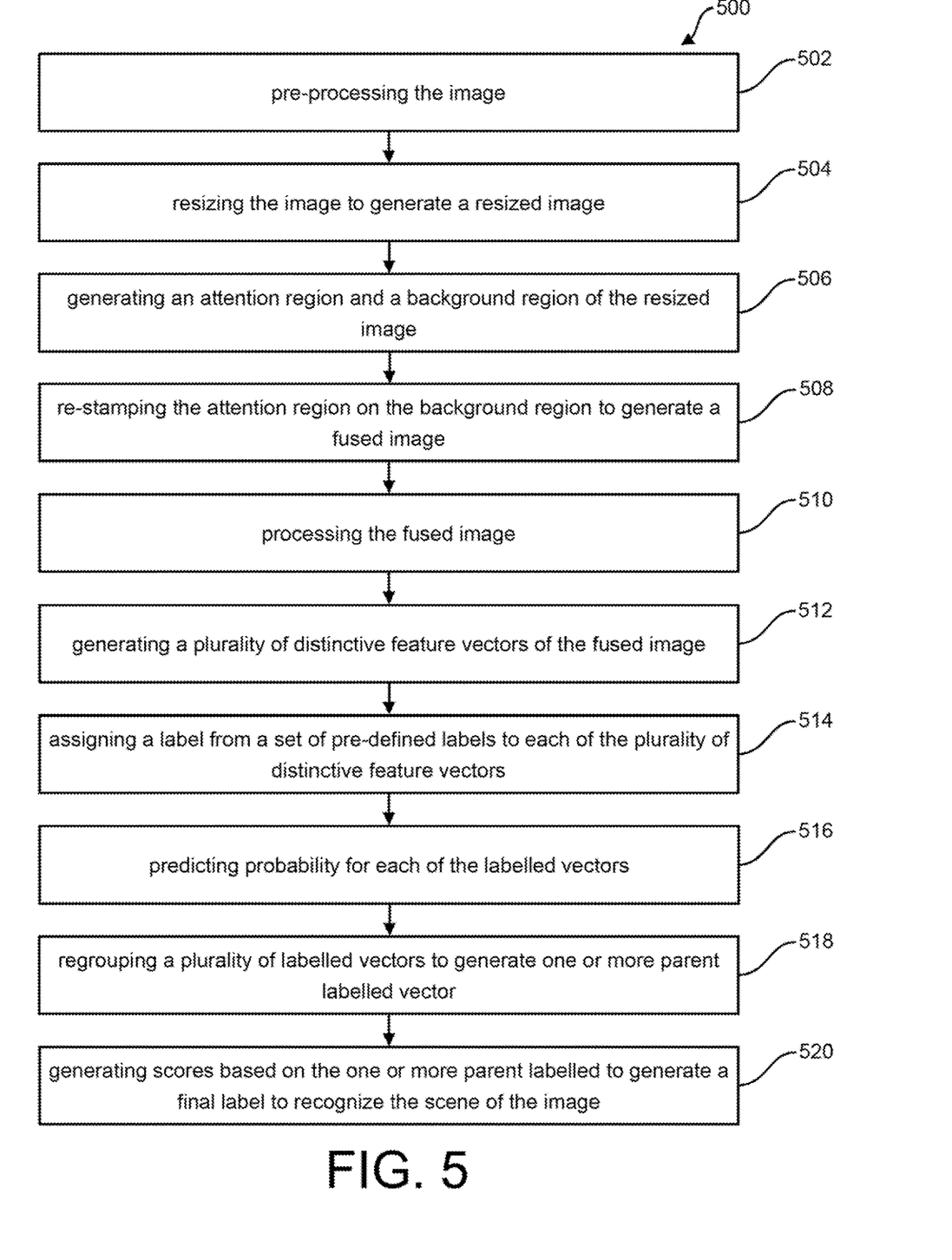
FIG. 5 illustrates a method for processing an image.

FIG. 5 illustrates a method for processing an image 500. The method includes steps of pre-processing, processing, and post-processing. Firstly, the pre-processing 502 receives a real-time image and generates an image attention fusion. Further, the pre-processing includes resizing the image 504 to generate a resized image. This followed with the generating an attention region and a background region 506 of the resized image. Finally, a step of re-stamping occurs where the attention region is overlaid on the background region to generate a fused image 508.

Secondly, in the in-processing step 510, the feature extraction is performed on the fused image via a deep learning model and generating one or more parent labeled vectors. Further, the processing includes generating a plurality of distinctive feature vectors of the fused image 512. Followed by, assigning a label from a set of pre-defined labels to each of the plurality of distinctive feature vectors 514 to generate a labeled vector. This followed by predicting probability for each of the labeled vectors 516 and finally regrouping a plurality of labeled vectors based on probability value to generate one or more parent labeled vector 518.

Lastly, generating scores based on one or more parent labeled vector and a final label is generated 520 to recognize the scene of the image based on the scores. The final label is developed through the multi-class specific threshold.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. An image processing system for recognizing a scene of an image, the image processing system comprising:
   a pre-processing unit for processing the image, wherein the pre-processing includes resizing the image, generating an attention region image and a background region image from the resized image, and re-stamping the attention region image on the background region image to generate a fused image;

a processing unit, for processing the fused image, comprising:

an encoder for generating a plurality of distinctive feature vectors of the fused image;

a labeler for assigning a label from a set of pre-defined labels to each of the plurality of distinctive feature vectors to generate labelled vectors;

a deep neural network for predicting a probability for each of the labelled vectors; and a class re-grouper for grouping the labelled vectors based on probability values of the probability to generate one or more parent labelled vectors; and a post-processing unit for generating scores for the one or more parent labelled vectors;

wherein a final label is generated based on the scores in order to recognize a scene of the image.

2. The image processing system of claim 1, wherein the image is captured by or stored on an electronic device.

3. The image processing system of claim 2, wherein the electronic device is a smart phone, a tablet or a digital camera.

4. The image processing system of claim 1, wherein the pre-processing unit generates the attention region image by reducing a pixel size of the resized image.

5. The image processing system of claim 1, wherein the processing unit is operable on a deep learning and subject classification model.

6. The image processing system of claim 1, wherein a probability gating is utilized by the deep neural network to predict the probability for each of the labelled vectors by analyzing illumination, texture, structure and subjects of the fused image.

7. The image processing system of claim 1, wherein the encoder generates the plurality of distinctive feature vectors by a plurality of descriptors.

8. The image processing system of claim 7, wherein each of the plurality of descriptors is a mixture of pixel properties based on color, texture or shape of the fused image.

9. The image processing system of claim 1, wherein the class re-grouper groups the plurality of labelled vectors based on a semantic similarity amongst the labelled vectors.

10. The image processing system of claim 1, wherein the post-processing unit generates scores based on one or more conditional thresholds for the one or more parent labelled vectors.

11. A method for recognizing a scene of an image comprising:

pre-processing the image, wherein the pre-processing comprises:

resizing the image and generating an attention region image and a background region image from the resized image to generate a fused image;

re-stamping the attention region image on the background region image to generate a fused image;

processing the fused image, wherein the processing comprises:

generating a plurality of distinctive feature vectors of the fused image;

assigning a label from a set of pre-defined labels to each of the plurality of distinctive feature vectors to generate labelled vectors;

predicting a probability for each of the labelled vectors; and regrouping the labelled vectors based on probability values of the probability to generate one or more parent labelled vectors; and generating scores based on the one or more parent labelled vector, and generating a final label to recognize the scene of the image based on the scores.

12. An AI based multi-media processing system for recognizing a scene from a multi-media, comprising:

a pre-processing unit for processing the multi-media, wherein the pre-processing comprises resizing the multi-media, generating an attention region image and a background region image of the resized multi-media, and re-stamping the attention region image on the background region image to generate a fused multi-media;

a processing unit for processing the fused multi-media, wherein the processing unit comprises:

an encoder for generating a plurality of distinctive feature vectors of the fused multi-media;

a labeler for assigning a label from a set of pre-defined labels to each of the plurality of distinctive feature vectors to generate labelled vectors;

a deep neural network for predicting a probability for each of the labelled vectors; and a class re-grouper for grouping the labelled vectors based on probability values of the probability to generate one or more parent labelled vectors; and a post-processing unit for generating scores for the one or more parent labelled vectors, and generating a final label based on the scores to recognize the scene of the multi-media.

13. The AI based multi-media processing system of claim 12, further comprising a subject label recognition system for combining one or more channels of multi-mode information with an original image, wherein the one or more channels includes auto-focus value, exposure value and motion value.

* * * * *